United States Patent
Rodriguez

(10) Patent No.: US 12,473,777 B2
(45) Date of Patent: Nov. 18, 2025

(54) ANTI-CLIMB SAFETY GATE TOPPER

(71) Applicant: Shane Rodriguez, Wellington, CO (US)

(72) Inventor: Shane Rodriguez, Wellington, CO (US)

(73) Assignee: Shane Rodriguez, Wellington, CO (US)

( * ) Notice: Subject to any disclaimer, the term of this patent is extended or adjusted under 35 U.S.C. 154(b) by 0 days.

(21) Appl. No.: 18/529,212

(22) Filed: Dec. 5, 2023

(65) Prior Publication Data
US 2025/0179869 A1 Jun. 5, 2025

(51) Int. Cl.
*E06B 9/02* (2006.01)
*E06B 9/00* (2006.01)

(52) U.S. Cl.
CPC .......... *E06B 9/02* (2013.01); *E06B 2009/002* (2013.01)

(58) Field of Classification Search
CPC ... E04H 17/003; E04H 17/004; E04H 17/063; E04H 17/013
See application file for complete search history.

(56) References Cited

U.S. PATENT DOCUMENTS

| | | | | |
|---|---|---|---|---|
| 321,171 A | * | 6/1885 | Archibald | E04H 17/004 256/12 |
| 511,701 A | * | 12/1893 | Jacobs | E04H 17/004 119/903 |
| 5,143,354 A | * | 9/1992 | Nolan | E04H 17/003 256/11 |
| 8,196,348 B2 | | 6/2012 | Flannery | |
| 10,472,884 B2 | * | 11/2019 | Maytorena | E04H 17/004 |
| 11,685,476 B2 | * | 6/2023 | McGarian | B63G 13/00 114/364 |
| 2004/0012006 A1 | * | 1/2004 | Petrozziello | E04H 17/05 256/1 |
| 2005/0218392 A1 | * | 10/2005 | Petrozziello | E04H 17/066 256/24 |
| 2009/0032788 A1 | * | 2/2009 | Adler | E04H 17/017 256/11 |
| 2013/0227888 A1 | * | 9/2013 | Nur-tegin | E05D 15/02 49/226 |
| 2014/0170366 A1 | * | 6/2014 | Whooley | E06B 9/02 428/188 |
| 2017/0175415 A1 | | 6/2017 | Moore | |
| 2017/0356215 A1 | * | 12/2017 | Kim | F21V 33/0064 |
| 2020/0408000 A1 | * | 12/2020 | Morris | E04H 17/003 |

FOREIGN PATENT DOCUMENTS

| | | | | |
|---|---|---|---|---|
| KR | 20080102582 A | * | 11/2008 | E04H 17/06 |
| WO | WO-2016016609 A1 | * | 2/2016 | A01K 3/00 |

* cited by examiner

*Primary Examiner* — Daniel P Cahn
*Assistant Examiner* — Patrick B. Ponciano
(74) *Attorney, Agent, or Firm* — Dorsey & Whitney LLP

(57) ABSTRACT

Described herein are systems and apparatuses of an accessory for to a baby gate. The accessory may be a gate topper that attaches to the top of a baby gate. The gate topper may include a bracket that is configured to selectively couple to a gate. The gate topper may also include an apron comprising a semi-flexible plastic sheet. The apron may include a central portion that is coupled to the bracket, a lower portion that extends below a top of the gate when the bracket is coupled to the gate, and an upper portion that extends above the top of the gate when the bracket is coupled to the gate.

20 Claims, 4 Drawing Sheets

ANTI-CLIMB SAFETY GATE TOPPER

TECHNICAL FIELD

The present disclosure relates generally to baby gate accessories. More particularly, some embodiment relate to an apparatus that attaches to a baby gate to make it more difficult for a child or pet to climb over the gate.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A baby gate is a safety device designed to prevent babies or young children from accessing certain areas of a home or other living space, such as staircases or rooms that may contain hazardous materials or objects. It typically consists of a sturdy frame made of metal, plastic, or wood, with a gate or door that can be opened and closed to allow or restrict access.

A baby gate can be used for animals, such as dogs or cats, as a means of keeping them contained in a certain area of the home. Many baby gates are designed to be adjustable and can be used to block off doorways or other openings that an animal may try to pass through.

Baby gates can be freestanding, pressure-mounted, or hardware-mounted. Freestanding gates can be moved from place to place and are often used to block off wider areas, such as doorways or open spaces. Pressure-mounted gates are secured in place by pressure against the walls or door frame and do not require any drilling or screws, making them a good option for temporary use. Hardware-mounted gates are attached to the wall or door frame with screws and are generally considered the most secure and permanent type of baby gate.

While baby gates are used to keep a child or animal safe, if the child or animal climbs over a baby gate, it can pose a serious safety risk as the child or animal may fall and injure themselves. Climbing over a baby gate may also lead to the gate becoming unstable or falling over, which can also cause injuries. To prevent children and animals from climbing over a baby gate, it is important to choose a gate that is the appropriate height and make sure it is installed securely.

However, if a child or animal is determined to climb over the gate, it may be necessary to use additional safety measures. Described herein are embodiments that provide a baby gate accessory that may be added to a gate to prevent a child or animal from scaling the gate. Embodiments herein may be adapted to be used with a plurality of gates from different manufactures. Specifically, embodiments provide a gate topper that may be attached to a baby gate. While embodiments herein describe the gate topper as an accessory that may be attached to a baby gate. The embodiments may be adapted to be manufactured as part of a baby gate.

The phrase "coupled to" is broad enough to refer to any suitable coupling or other form of interaction between two or more entities. Thus, two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive).

Figure 1:
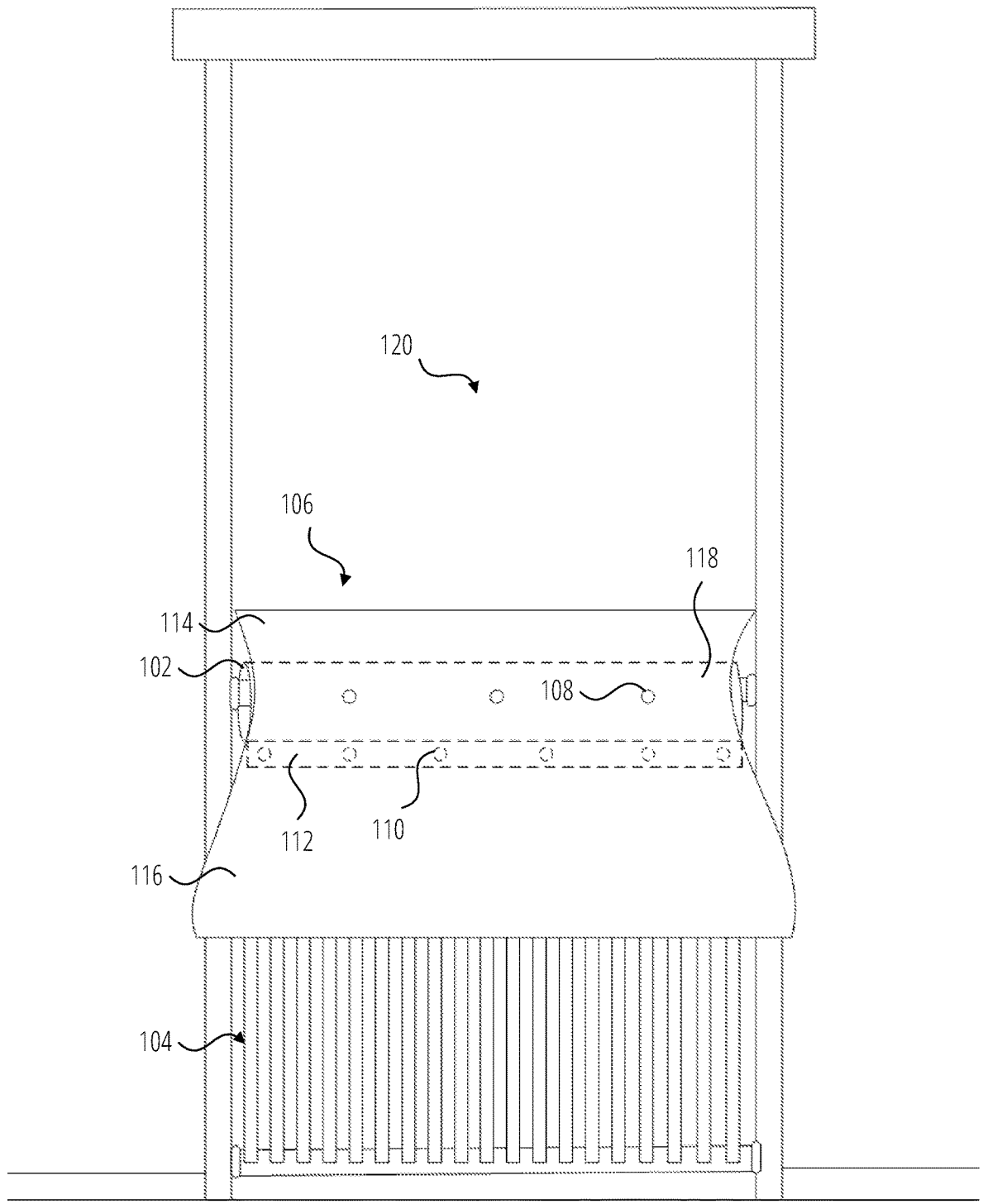
FIG. 1 illustrates a gate topper in accordance with some embodiments.

FIG. 1 illustrates a gate topper 120 in accordance with some embodiments. The gate topper 120 includes an apron 106 and bracket 102. The gate topper 120 attaches to the top portion of a gate 104 to add height to the gate 104 and make holding the top of the gate 104 more difficult to prevent children from climbing over the gate 104.

The apron 106 is coupled to the bracket 102. In some embodiments, one or more fasteners 108 may be used to couple the apron 106 to the bracket 102. The one or more fastener 108 may be bolts, rivet, or screw. In other embodiments, the apron 106 and the bracket 102 may be coupled with a weld or a permanent adhesive such as epoxy resin. In yet other embodiments, the apron 106 and the bracket 102 may be molded together. The apron 106 may be able to pivot with the point of connection to the bracket 102 being the fulcrum.

The bracket 102 selectively couples with a top portion of the gate 104. In the illustrated embodiment, the bracket 102 is a tubular structure the width of a center portion of the apron 106. The bracket 102 may be a ridged plastic. The inside portion of the tubular structure rests on top of a gate 104. The tubular shape may allow the bracket 102 to partially rotate if the gate topper 120 is pushed on by a baby or animal.

The bracket 102 includes a slot across the entire width of the bracket 102. The slot is sized and shaped to fit over the gate 104 top. The amount that the bracket 102 may rotate be limited by the size of tube, the rigidness of the plastic and the size of the slot. In some embodiments, the slot is slightly narrower than the thickness of the gate poles and top such that when the bracket 102 is placed over the gate 104, the bracket 102 provides a clamping force to retain the gate topper 120 on the gate 104.

In some embodiments, the bracket 102 may be secured to the gate 104 via one or more fasteners 110. In the illustrated embodiment, the fasteners 110 are rounded off bolts that extend through openings between poles of the gate 104. The fasteners 110 couple a first tab 112 on one side of the slot to a second tab on the opposite side of the slot. In other embodiments, other types of fasteners may be used to secure the bracket 102 to the gate 104. For example, the bracket 102 may be secured using one or more hook and loop fasteners, cords, clips, clamps, or latching mechanisms. The fasteners may be used to couple opposing sides of the slot in the bracket 102 to each other, or may be used to secure the bracket 102 directly to the gate 104.

The illustrated embodiment shows a single bracket 102 that extends across the width of the apron 106. Other embodiments may include multiple brackets. For example, four separate brackets may be spaced equally across the width of the apron 106.

The apron 106 comprises a semi-ridged plastic panel. The apron 106 is crack resistant and while it is semi-ridged allows some amount of bending. The semi-ridged plastic panel is a type of plastic material that has some degree of flexibility but is not completely pliable. It may be made from thermoplastic materials such as polyethylene, polycarbonate, polypropylene, or PVC. The plastic panel can be bent or shaped to some extent without breaking or cracking, but it does have some resistance to deformation. This property makes it useful for preventing a child or animal to climb the gate 104 because when a child or animal pushes or pulls on the apron 106 the plastic panel will bend to prevent the animal or child from climbing onto the apron. The thickness and degree of flexibility of a semi-flexible plastic sheet can vary depending on the specific material and manufacturing process used. Overall, the semi-ridged plastic panel offers a balance between flexibility and durability.

The apron 106 may be secured to the bracket 102 such that the apron 106 is at an angle relative to the ground when the gate topper 120 is coupled to the gate 104. The apron 106 may have a central portion 118, an upper portion 114, and a lower portion 116. The central portion 118 may be attached to the bracket 102. The upper portion 114 extends away from the bracket 102 in a first direction and the lower portion 116 extends away from the bracket 102 in a second direction. When the gate topper 120 is coupled to the gate 104, the upper portion 114 extends through a doorway in a first direction, and the lower portion extends through a doorway in a second direction. The angled position of the apron 106, when the gate topper 120 is installed, causes the upper portion 114 to be positioned above the gate 104 and the lower portion 116 to be positioned below the top of the gate 104.

The apron 106 may include tapered edges to facilitate positioning within a doorway or other entry point. For example, the apron 106 may be more narrow in the central portion 118 and designed to have a tapered or hourglass shape. The tapered shape of the apron 106 allows it to have varying thicknesses of width at different points along its length. In the illustrated embodiment, the apron 106 is wider at the top and bottom edges and narrower in the middle, giving it an hourglass shape.

The central portion 118 of the apron 106 can provide several functional benefits. For example, it can help to reduce the weight of the sheet while maintaining its structural integrity. The narrower central portion 118 can also help to increase the flexibility of the apron 106, allowing it to bend and curve more easily. Additionally, the narrower section may more easily fit inside a doorway while the wider ends may provide a larger barrier to prevent a child or animal from going around the gate topper 120.

The upper portion 114 and the lower portion 116 may also feature concave surfaces which may also be referred to as concave ramps. The central portion 118 may have a convex shape with a curve that follows the circumference of the bracket 102. The concave surfaces may provide additional challenge for a child or animal to climb over the gate topper 120. Additionally, the concave surfaces allow for a greater surface area while reducing the amount that the apron 106 protrudes through a doorway.

The gate topper 120 may be capable of moving between a resting position, a pushed down position, and a pushed up position. The resting position refers to the position of the gate topper 120 when placed on the gate 104 without a person or animal touching it.

The pushed down position refers to the position of the gate topper 120 when placed on the gate 104 and while a person or animal is pushing down on the lower portion 116. As will be shown, when a person or animal pushes down on the lower portion 116, the bracket 102 may roll toward the pusher and the lower portion 116 of the apron 106 will bend down with the pusher causing the upper portion 114 to move up making the gate topper 120 taller. Even if a child is able to reach the top of the apron 106 the long apron 106 makes it difficult for the child to get a foot hold. Also, the semi-ridged nature of the plastic may make kids and pets unsure of its strength to hold them.

Figure 2:
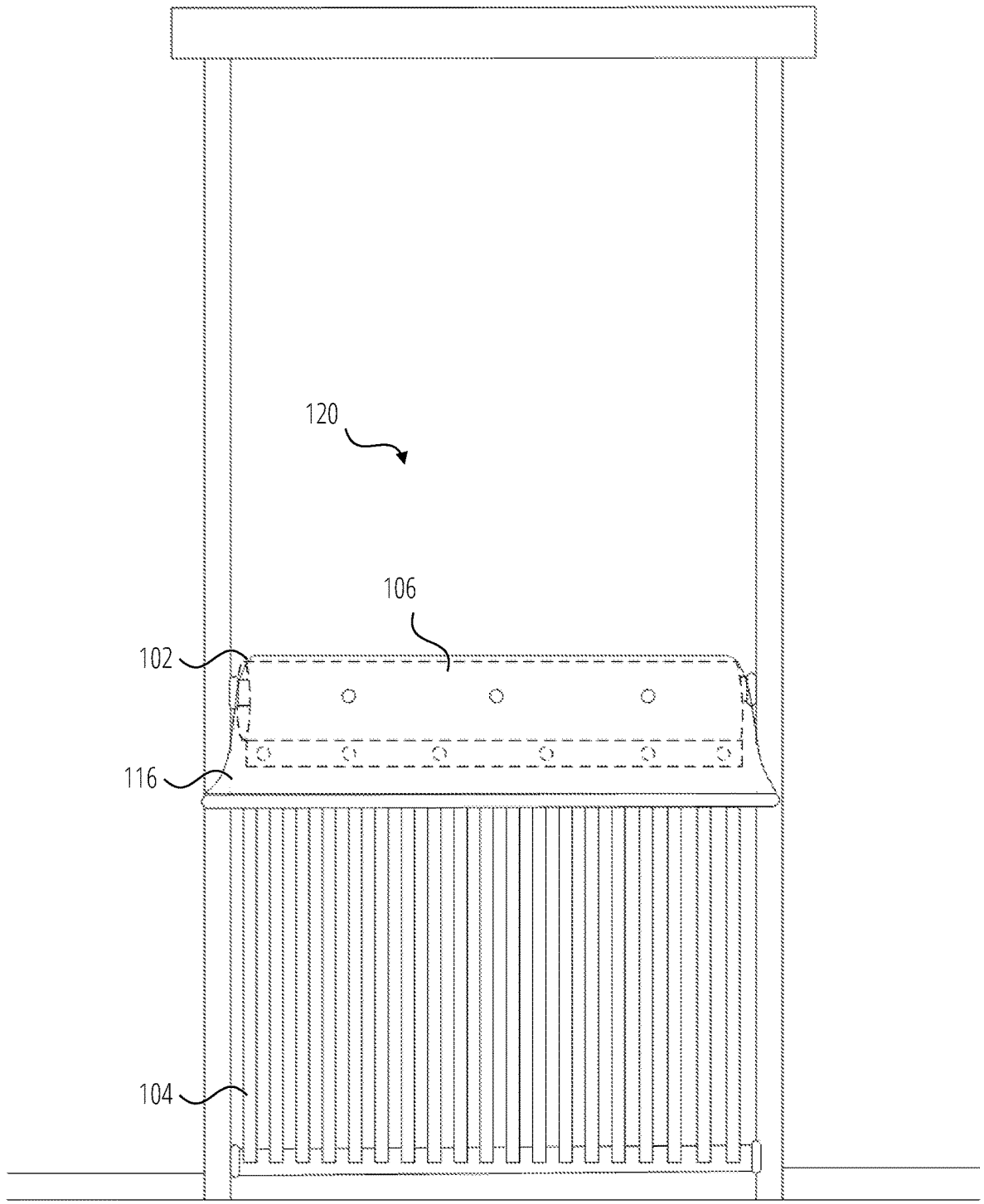
FIG. 2 illustrates a front view of the gate topper in the pushed up position in accordance with some embodiments.

The pushed up position refers to the position of the gate topper 120 when placed on the gate 104 while a person or animal is pushing up on the lower portion 116. FIG. 2 illustrates a front view of the gate topper 120 in the pushed up position. The pushed up position refers to the position of the gate topper 120 when placed on the gate 104 and while a person or animal is pushing up on the lower portion 116.

When a person or animal pushes up on the lower portion 116, the bracket 102 may roll away from the pusher and the lower portion 116 of the apron 106 will bend up forming a canopy above the pusher. The canopy may prevent the pusher from climbing over the gate 104. After the pusher stops pushing up or down on the lower portion 116, the gate topper 120 returns to the resting position.

Figure 3:
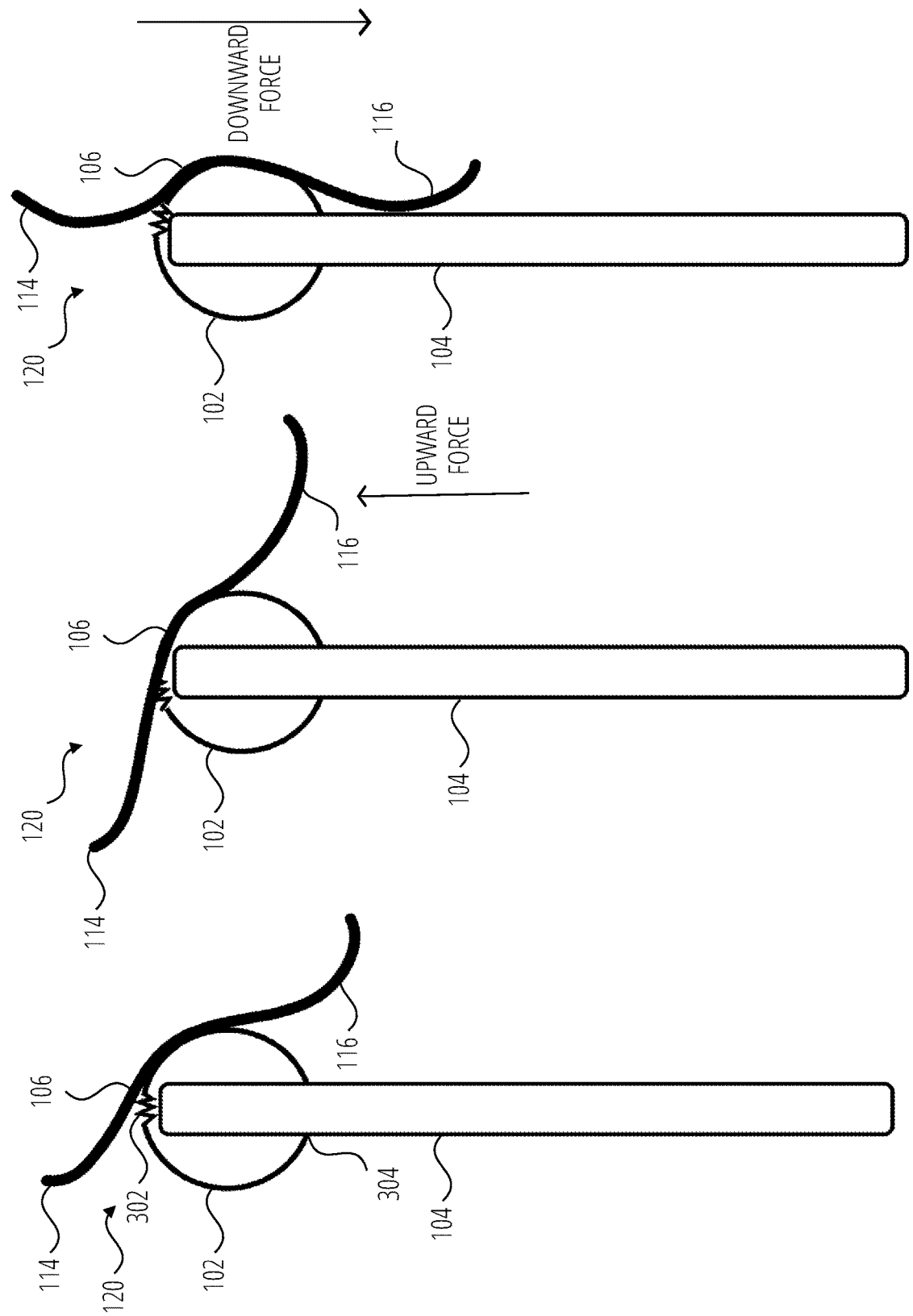
FIG. 3A illustrates a side view of the gate topper in a resting position in accordance with some embodiments.
FIG. 3B illustrates a side view of the gate topper in a pushed up position in accordance with some embodiments.
FIG. 3C illustrates a side view of the gate topper in a pushed down position in accordance with some embodiments.

FIGS. 3A-3C illustrate a side view of a gate topper 120. Specifically, FIG. 3A illustrates a side view of the gate topper 120 in a resting position. FIG. 3B illustrates a side view of the gate topper 120 in a pushed up position. FIG. 3C illustrates a side view of the gate topper 120 in a pushed down position.

As shown in FIG. 3A, when the gate topper 120 is in a resting position, the apron 106 may rest at an angle relative to the gate 104. The lower portion 116 may include a concave portion that extends lower than the top of the gate 104 and curves out and away from the gate 104. The upper portion 114 may extend above and beyond the gate 104 in the direction opposite the lower portion 116. The upper portion 114 may also feature a concave surface. In some embodiments, one or both of the upper portion 114 and the lower portion 116 may have convex surfaces instead of concave surfaces.

The bracket 102 may selectively couple to the gate 104. The bracket 102 may rest on the top of the gate 104. The bracket 102 may comprise a hinge 302. The hinge 302 may be bendable to allow a person to widen a slot 304 configured to fit over the gate 104. The user may pull the slot 304 apart to make it larger by causing the hinge 302 to flex. In some embodiments, the act of pushing the bracket 102 over the gate 104 may cause the hinge 302 to flex and the 304 to open wider due to the interaction with the gate 104. The angled position of the apron 106 may be accomplished by coupling the apron 106 to the circumference of the tube of the bracket 102 off axis relative to the slot (e.g., at a point between 90 degrees and 180 degrees relative to the slot).

When flexed, the hinge 302 may exhibit a clamping force that causes the slot 304 to close tightly around the gate 104. Thus, the bracket 102 may be considered a self-closing clamp or spring clamp. The bracket 102 comprises two sides that are hinged together at one end via the hinge 302. In some embodiments, the hinge 302 may be more flexible than the other portions of the bracket 102, while also having a spring force that causes the hinge to return to a non-flexed position. In some embodiments, the hinge 302 may comprise a weakened portion of the bracket 102. For example, a series of groves may be formed along the length of the bracket 102 to create the hinge 302.

As shown in FIG. 3B, when the gate topper 120 is in a pushed up position, the bracket 102 may rotate and the apron 106 may be oriented in a more horizontal position. A child or animal may push up on the lower portion 116 of the gate topper 120 causing an upward force. The upward force may cause the gate topper 120 to rotate into the pushed up position. The change in position may be caused by the bracket 102 rotating, the apron 106 flexing, and/or the apron 106 pivoting. As shown, when the gate topper 120 is in the pushed up position, the lower portion 116 forms a canopy which may prevent a child or animal from climbing over the gate 104.

As shown in FIG. 3C, when the gate topper 120 is in a pushed down position, the bracket 102 may rotate and the apron 106 may be oriented in a more vertical position. A child or animal may push down on the lower portion 116 of the gate topper 120 causing a downward force. The downward force may cause the gate topper 120 to rotate into the pushed down position. The change in position may be caused by the bracket 102 rotating, the apron 106 flexing, and/or the apron 106 pivoting. As shown, when the gate topper 120 is in the pushed down position, the upper portion creates a gate extension making climbing over the gate more difficult. Additionally, in the pushed down position, the lower portion 116 may extend downward along the gate creating a barrier for a child to get a foothold between poles of the gate 104.

Thus, as shown, the gate topper 120 may pivot, flex, and rotate in response to external forces. When the upward or downward force stops being applied, the gate topper 120 may return to the resting position.

As has been shown, the bracket may be a tube, which may be made of plastic, metal or other suitable materials. In some embodiments, attached to the tube is a plastic sheet (e.g., apron 106) that spans across the length of the tube and extends in two directions. The plastic sheet may be flexible and can pivot or rotate relative to the tube.

When an external force is applied to the plastic sheet, it can pivot and flex along the length of the tube. Additionally, the tube may be able to partially rotate when installed on a gate. This movement allows the device to absorb and distribute forces, while also providing some degree of rotational movement. Overall, the gate topper 120 is a versatile device that can flex, pivot, and rotate to enhance the security of a gate.

Figure 4:
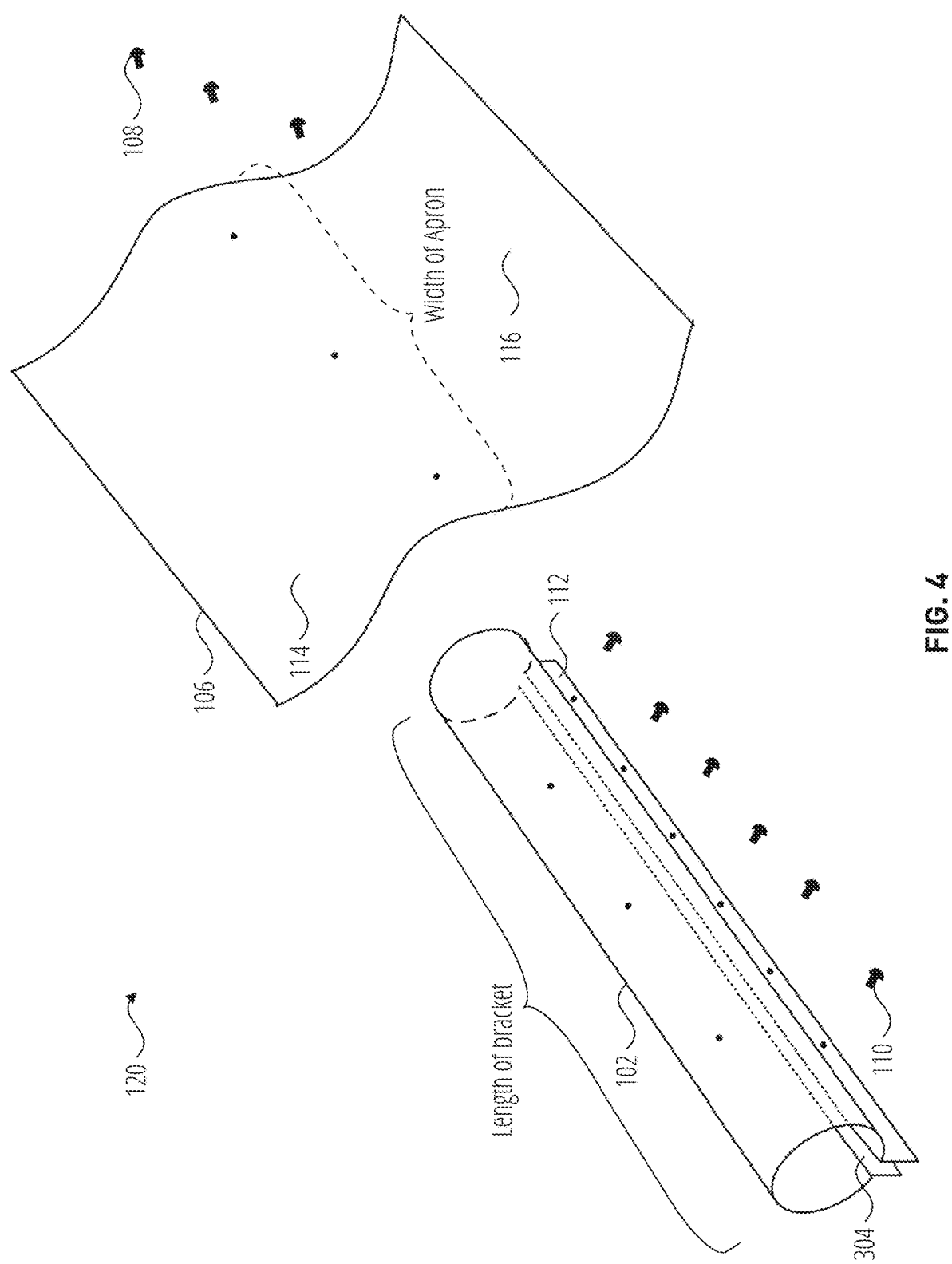
FIG. 4 illustrates an exploded perspective view of a gate topper in accordance with some embodiments.

FIG. 4 illustrates an exploded perspective view of a gate topper 120. As shown, the gate topper 120 may include an apron 106 and a bracket 102. As shown, the apron 106 may be coupled to the bracket 102 with a series of fasteners 108. As shown, the fasteners 108 may be positioned across the width of a center portion of the apron 106. By securing the apron 106 to the bracket 102 with a series of fasteners 108 in a straight line, the apron 106 may be capable of pivoting with the line of fasteners 108 serving as the pivot point.

The bracket 102 may be a tube with two open ends and a slot 304 across the length of the tube. The slot 304 may be sized and shaped to fit over a gate. The bracket 102 may be designed to securely attach to the top of a gate via the slot 304 that runs across its length. The slot 304 may allow the clamp tube to easily and securely attach to the baby gate, providing a strong and stable connection. The slot 304 allows for easy attachment and detachment of the baby gate.

The bracket 102 may be made from durable and lightweight materials, making it easy to handle and install. The bracket 102 may be designed to be both strong and flexible, allowing it to securely clamp to the baby gate while also providing some flexibility. The bracket 102 may provide an easy to use, adjustable mechanism to provide secure and stable connection with a gate, giving parents peace of mind that their children are safe and secure.

In some embodiments, the bracket 102 may include a tab 112 on each side of the slot 304. One or more fasteners fastener 110 may extend between the tabs 112 through a gate's poles. In some embodiments, the clamping force of the bracket 102 may be sufficient to secure the gate topper 120 to a gate.

The apron 106 may feature an upward curved upper portion 114 and an upward curved lower portion 116. The upward curves of the illustrated embodiment may be referred to as concave surfaces. The apron 106 may be a sheet made of a durable, lightweight plastic material, and may be molded or thermoformed into the desired shape. In other embodiments, one or both of the upper portion 114 and the lower portion 116 may feature downward curves. For example, the lower portion 116 may have a downward curve (also referred to herein as a convex surface), and the upper portion 114 may have an upward curve (e.g., concave surface).

The gate topper 120 is an apparatus that provides a solution for parents and caregivers to prevent children or animals from climbing over a gate. The gate topper 120 extends the height of their baby gate to prevent scaling. In addition, the apron 106 of the gate topper 120 is capable of moving when force is applied to further discourage climbing. The gate topper 120 is designed to be compatible with most standard baby gates and can be easily installed.

The gate topper 120 may be made from durable and lightweight materials, making it easy to handle and install. It features a simple yet effective design that allows it to be quickly and securely attached to the top of the baby gate. In some embodiments, the gate topper 120 may be adjustable, allowing it to be extended to various widths or heights to meet the needs of different situations. The gate topper 120 is particularly useful for parents with older children or pets that are able to climb over the standard height of the baby gate.

The gate topper 120 is also designed to be easy to remove, allowing parents to quickly and easily revert the gate back to its original height when needed. It can be stored conveniently when not in use and is compact enough to be transported easily. Overall, the gate topper 120 may enhance a gate and provide a secure and safe solution to keep children and pets contained.

It is important for a baby gate to not only prevent children from accessing restricted areas, but also for adults to be able to easily access the area when needed. Therefore, in addition to providing a secure barrier, in some embodiments, the gate topper 120 may include slots, notches or other features that allow a user to reach a lock of the gate. This ensures that adults can easily open and close the gate as needed, while still maintaining the safety and security of the gate.

In some embodiments, the gate topper 120 may include a locking mechanism to prevent it from being removed without adult supervision. The lock can be designed with a variety of mechanisms, including a simple latch, a key lock, or a combination lock. It is important that the mechanism is easy to operate, but still secure enough to prevent children from removing the gate topper 120. In addition to the lock, the gate itself should be designed with easy-to-use features, such as a one-handed release mechanism.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

What is claimed is:

1. An apparatus to attach to a baby gate, the apparatus comprising:
    a bracket that is configured to selectively couple to a gate, wherein the bracket comprises:
        a tube with a slot across a length of the tube, and
        a hinge configured to selectively widen the slot to fit the tube over the gate; and
    an apron comprising a semi-flexible sheet, wherein the semi-flexible sheet comprises:
        a central portion that is coupled to the bracket;
        a lower portion that is suspended by the central portion and extends away from the bracket and below a top of the gate when the bracket is coupled to the gate; and
        an upper portion that extends above the top of the gate when the bracket is coupled to the gate,
        wherein when the bracket is coupled to the gate when the gate is positioned in a doorway, the lower portion extends through the doorway in a first direction, and the upper portion extends through the doorway in a second direction when no force by a user is applied to the apron, and
        wherein the central portion of the apron is narrower than the lower portion and the upper portion of the apron.

2. The apparatus of claim 1, wherein the lower portion comprises a first concave ramp, the upper portion comprises a second concave ramp, and the central portion comprises a convex surface.

3. The apparatus of claim 1, wherein the apron is coupled to the bracket such that it is angled relative to the gate when the bracket is coupled to the gate.

4. The apparatus of claim 3, wherein when a downward force is applied to the lower portion while the bracket is coupled to the gate, the apron rotates to a vertical orientation.

5. The apparatus of claim 3, wherein when an upward force is applied to the lower portion while the bracket is coupled to the gate, the apron rotates to a diagonal orientation.

6. The apparatus of claim 1, wherein the tube has the length that is equal to a width of the central portion of the semi-flexible sheet.

7. The apparatus of claim 6, wherein the bracket has a clamping force sufficient to couple to the gate when the gate is in the slot.

8. The apparatus of claim 6, further comprising one or more fasteners that couple a first tab on one side of the slot to a second tab on an opposite side of the slot.

9. The apparatus of claim 6, further comprising a set of fasteners that couple the central portion of the semi-flexible sheet to the tube, wherein the set of fasteners are arranged in a straight line such that the semi-flexible sheet is configured to pivot.

10. An apparatus to attach to a baby gate, the apparatus comprising:
    a bracket comprising:
        a tube with two open ends and a slot extending between the two open ends across a length of the tube, the slot sized and shaped to fit over a gate, and
        a hinge configured to selectively widen the slot; and
    an apron coupled to the bracket such that it is angled relative to the gate when the bracket is coupled to the gate, wherein the apron is coupled to the bracket at a central portion of the apron such that a first portion of the apron extends away from the bracket to a first suspended end and a second portion of the apron extends away from the bracket to a second suspended end,
    wherein when the bracket is coupled to the gate when the gate is positioned in a doorway, the first portion of the apron extends through the doorway in a first direction, and the second portion of the apron extends through the doorway in a second direction when no force by a user is applied to the apron, and
    wherein the central portion of the apron is narrower than the first portion of the apron and the second portion of the apron.

11. The apparatus of claim 10, wherein the first portion extends beyond the bracket in a first direction and the second portion that extends beyond the bracket in a second direction.

12. The apparatus of claim 11, wherein the first portion extends below a top of the gate when the bracket is coupled to the gate; and
    wherein the second portion extends above the top of the gate when the bracket is coupled to the gate.

13. The apparatus of claim 11, wherein the first portion comprises a first concave ramp, and the second portion comprises a second concave ramp.

14. The apparatus of claim 11, wherein when a downward force is applied to the first portion while the bracket is coupled to the gate, the apron rotates to a vertical orientation.

15. The apparatus of claim 11, wherein when an upward force is applied to the first portion while the bracket is coupled to the gate, the apron rotates to a diagonal orientation.

16. The apparatus of claim 10, wherein the apron is a semi-flexible plastic sheet.

17. The apparatus of claim 10, wherein the bracket has a clamping force sufficient to couple to the gate when the gate is inserted in the slot.

18. The apparatus of claim 10, wherein the length of the tube of the bracket is equal to a width of the central portion of the apron.

19. The apparatus of claim 10, wherein the apron pivots relative to the bracket.

20. An apparatus to attach to a baby gate, the apparatus comprising:
  a bracket comprising:
    a tube with two open ends and a slot extending between the two open ends across a length of the tube, the slot sized and shaped to fit over a gate, and
    a hinge configured to selectively widen the slot; and
  an apron coupled to the bracket, the apron comprising:
    a first concave portion extending away from the bracket in a first direction forming a first suspended surface, and
    a second concave portion extending away from the bracket in a second direction forming a second suspended surface,
  wherein the bracket is configured to partially rotate when installed on the gate when a force is applied to the first concave portion or the second concave portion, and
  wherein the apron is configured to pivot relative to the bracket and flex when the force is applied to the first concave portion or the second concave portion,
  wherein when the bracket is coupled to the gate when the gate is positioned in a doorway, the first concave portion extends through the doorway in a first direction, and the second concave portion extends through the doorway in a second direction when no force by a user is applied to the apron, and
  wherein a central portion of the apron is narrower than the first concave portion and the second concave portion of the apron.

* * * * *